United States Patent [19]
Zell et al.

[11] Patent Number: 5,066,477
[45] Date of Patent: Nov. 19, 1991

[54] PRODUCTION OF CHLORINE DIOXIDE

[75] Inventors: Michael S. Zell; Maurice C. J. Fredette, both of Mississauga, Canada

[73] Assignee: Tenneco Canada Inc., Islington, Canada

[21] Appl. No.: 584,494

[22] Filed: Sep. 18, 1990

Related U.S. Application Data

[63] Continuation of Ser. No. 230,962, Aug. 11, 1988, abandoned.

[51] Int. Cl.$^5$ ............................................. C01B 11/02
[52] U.S. Cl. ................................... 423/479; 423/478
[58] Field of Search .................. 423/477, 478, 479; 422/234; 137/889

[56] References Cited

U.S. PATENT DOCUMENTS

| | | | |
|---|---|---|---|
| 3,864,456 | 2/1975 | Winfield et al. | 423/478 |
| 3,895,100 | 7/1975 | Cowley | 423/478 |
| 4,081,520 | 3/1978 | Swindell's et al. | 423/478 |
| 4,145,401 | 3/1979 | Swindell's et al. | 423/479 |
| 4,320,092 | 3/1982 | Kondo et al. | 422/224 |
| 4,393,035 | 7/1983 | Fredette | 423/478 |
| 4,393,036 | 7/1983 | Fredette | 423/478 |
| 4,470,868 | 9/1988 | Norell | 423/479 |

Primary Examiner—Michael L. Lewis
Assistant Examiner—Brian M. Bolam
Attorney, Agent, or Firm—Sim & McBurney

[57] ABSTRACT

Chlorine dioxide is produced from sodium chlorate, sulphuric acid and methanol at the boiling point of the reaction medium under a subatmospheric pressure applied to a reaction zone. High purity of chlorine dioxide production is retained while the proportion of acid sodium sulphate in the product is decreased by effecting the reaction at high acidity in a physically-separate reaction zone from which the reaction products discharge into a mass of recycling sodium chlorate solution.

26 Claims, 2 Drawing Sheets

PRODUCTION OF CHLORINE DIOXIDE

This is a continuation of co-pending application Ser. No. 230,962 filed on Aug. 11, 1989, now abandoned.

FIELD OF INVENTION

The present invention relates to the production of chlorine dioxide by reduction of sodium chlorate.

BACKGROUND TO THE INVENTION

Chlorine dioxide for use as a pulp mill bleach chemical is produced by reduction of sodium chlorate in an aqueous acid reaction medium. It is well known that the reaction to produce chlorine dioxide is represented by the equation:

$$ClO_3^- + Cl^- + 2H^+ \rightarrow ClO_2 + \tfrac{1}{2}Cl_2 + H_2O$$

The chloride ion for this reaction may be provided from an external source, in which case chlorine is co-produced with the chlorine dioxide, or may be provided in situ by reduction of the co-produced chlorine using reducing agents, such as methanol and sulfur dioxide.

One well-known commercial embodiment of the process is the so-called ERCO R3 (trademarks) process, wherein sodium chlorate, sodium chloride and sulfuric acid are reacted together at an acidity of about 2 to about 4.8 normal in a single vessel at the boiling point of the reaction medium while a subatmospheric pressure is applied to the reactor. The chlorine dioxide and chlorine are removed from the reaction vessel in admixture with the steam and anhydrous neutral sodium sulfate precipitates from the reaction medium, once saturation has been achieved after start-up. This process is generally described in U.S. Pat. No. 3,864,456 (E26), assigned to the assignee hereof.

As described in U.S. Pat. No. 3,895,100 (E107), assigned to the assignee hereof, a slurry of reaction liquor and sodium sulphate crystals is removed from the reaction vessel, the crystals are removed by filtration, make-up sodium chlorate and sodium chloride are added and the resulting recycle stream is reheated while being subjected to a back pressure sufficient to prevent it from boiling in the reboiler. The reheated recycle liquor passes through the throat of a venturi where make-up sulfuric acid is introduced. Chlorine dioxide production immediately commences and the recycle mixture is allowed to expand on the downstream side of the venturi and the resulting three-phase mixture of gases, solids and liquid is re-introduced to the reaction vessel. Chlorine dioxide and chlorine in the recycle mixture and produced in the reaction vessel are removed from the reaction vessel.

More recently, the ERCO R8 (trademark) process has become popular with pulp mills. This process differs from the R3 process in using a much higher acidity, generally greater than about 9 normal, and methanol in place of the sodium chloride. In addition, no catalyst is required. The result of the changes is that substantially pure chlorine dioxide is formed (the methanol reduces the co-produced chlorine to chloride ions) at greater efficiency than is achievable in the R3 process even with a catalyst. The R8 process is described in U.S. Pat. Nos. 4,081,520 (E130), 4,393,035 (E170) and 4,393,036 (E172), assigned to the assignee hereof.

One drawback of the R8 process, however, is that, because of the significantly higher acidity that is used than in the R3 process, the sodium sulphate by-product is acidic and requires neutralization.

SUMMARY OF THE INVENTION

In the present invention, a novel manner of effecting the R8 process is provided whereby, if desired, the production of chlorine dioxide may be combined with R3 production at much lower acidity than is used in the R8 process, so as to obtain the sodium sulphate product in a less acidic form while the chlorine dioxide production rate is retained.

This result is achieved by placing a pipe of short length in the recycle venturi and introducing concentrated sulphuric acid and methanol to a portion of the recycle liquor passing through the pipe. The reaction of sodium chlorate, sulphuric acid and methanol in the high acidity environment of the pipe is very rapid and substantially complete before the reactants leave the pipe.

A mixed R3/R8 process can be practiced according to the invention by feeding sodium chloride into the remainder of the recycle liquor to form chlorine dioxide and chlorine by reaction, downstream of the short pipe, between the introduced sodium chloride, sodium chlorate in the recycle stream and sulphuric acid introduced to the pipe. In this mixed process, the product gas stream contains a proportion of chlorine, depending on the amount of sodium chloride introduced to the recycle stream.

DESCRIPTION OF PREFERRED EMBODIMENT

Figure 1:
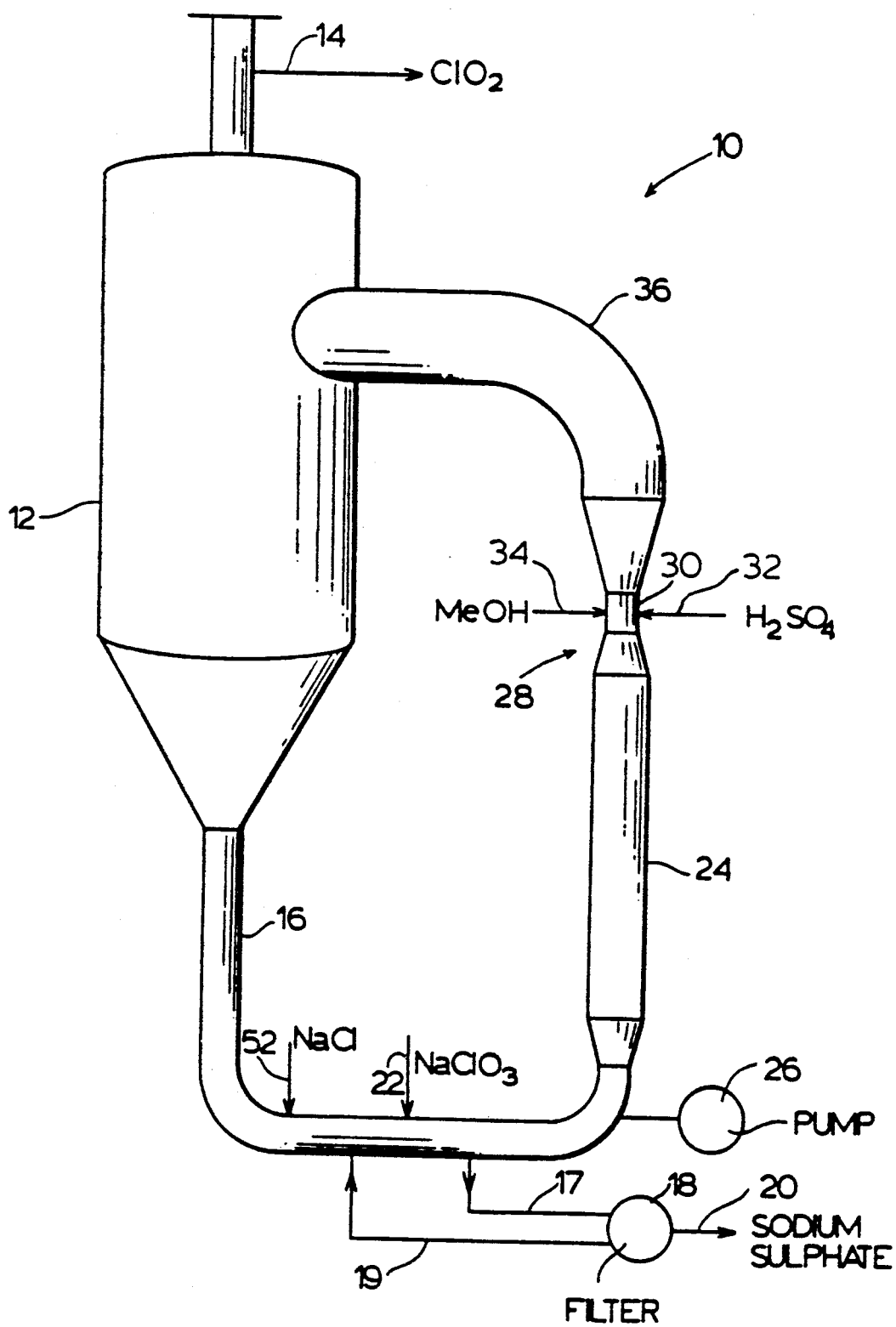
FIG. 1 is a schematic representation of a chlorine dioxide generator modified in accordance with the present invention.

Referring to the drawings, a chlorine dioxide generator unit 10 has an evaporator-crystallizer vessel 12 which has an upper outlet 14 for recovery of product chlorine dioxide from the unit 10. The chlorine dioxide product is removed as a gaseous admixture with steam produced by evaporation of the reaction medium in the vessel 12 and may contain some chlorine, depending on the efficiency of chlorine dioxide production and on whether or not sodium chloride is introduced as a reductant. The vessel 12 is subjected to subatmospheric pressure to maintain the reaction medium therein at the boiling point. The product gas stream in line 14 is processed to form an aqueous solution of chlorine dioxide for subsequent use, such as in pulp mill bleaching.

A slurry of crystallized by-product sodium sulphate in spent reaction medium is removed from the vessel by pipe 16, is passed by line 17 to a filter 18 for removal of the solid phase and the mother liquor is returned by line 19 to the recycle pipe 16. The by-product solid phase sodium sulphate recovered in line 20 may take the form of anhydrous neutral sodium sulphate, sodium sesquisulphate or mixtures containing varying proportions thereof, depending on the total acid normality of the reaction medium in the vessel 12, which may range from about 2 to about 12 normal, and even down to 0 normal, as discussed below. In the embodiment described below wherein a proportion of the chlorine dioxide product is produced by reaction between sodium chlorate, sodium chloride and sulphuric acid, the resulting lower reaction medium acidity, in the range of about 2 to about 4.8 normal, produces a solid by-product sodium sulphate which is neutral anhydrous sodium sulphate or substantially so. For reaction medium acid normalities from about 4.8 to about 6 normal, variable mixtures are obtained while, for acid normalities from about 6 to about 10, the sodium sulphate is sodium sesquisulphate or substantially so.

Sodium chlorate is fed to the recycle pipe 16 by line 22 to make up for sodium chlorate consumed in the process. Sodium chlorate is fed as an aqueous solution thereof to said recycle pipe 16, generally having a concentration of about 1 to about 7.5 molar, preferably about 5 to about 6.5 molar.

Feed of the make-up sodium chlorate solution produces a recycle solution generally having a concentration of sodium chlorate of about 0.25 to about 3.5 molar, preferably about 0.5 to about 1.5 molar. The recycle mixture then is pumped through a reboiler 24 by pump 26 to a venturi 28. The recycle mixture is heated by the reboiler 24 to the reaction temperature generally in the range of about 50° to about 90° C., preferably about 70° to about 80° C.

The upstream side of the venturi 28 converges towards the throat 30 and exerts a back pressure on the recycle stream which prevents the mixture from boiling in the reboiler 24.

At the throat 30, sulphuric acid is fed by line 32 and methanol is fed by line 34 into the recycle stream, in the specific manner shown in FIG. 2 and described in more detail below. As a result of the feed of these reactants, chlorine dioxide is generated and passes along with spent reaction medium through pipe 36 back to the vessel 12.

Figure 2:
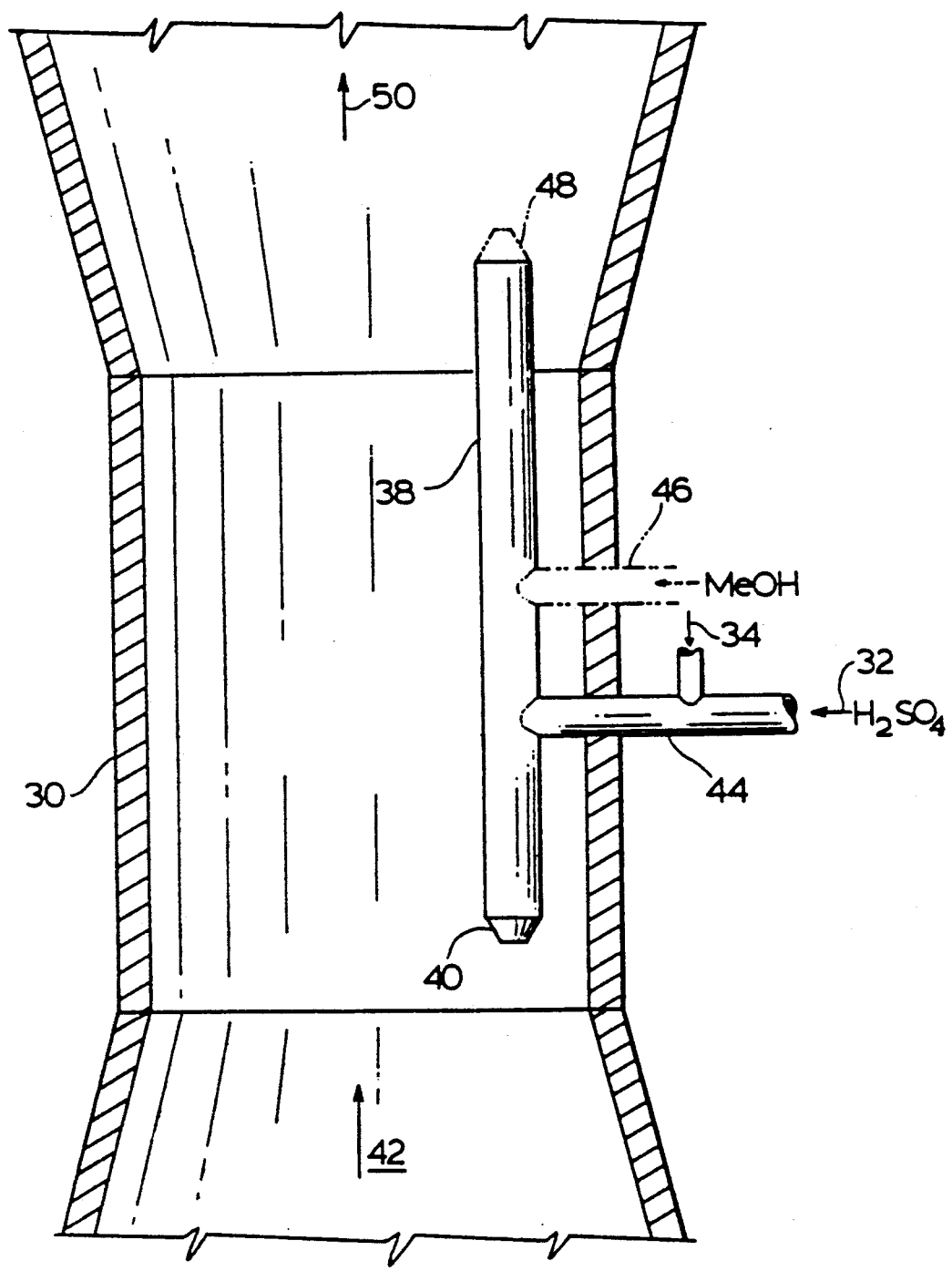
FIG. 2 is an enlarged view of the venturi throat of the chlorine dioxide generator of FIG. 1.

As seen more particularly in FIG. 2, there is positioned within the venturi throat 30, an elongate pipe 38 which has a lower inlet 40 through which passes a portion of the recycle stream 42. The proportion of the recycle stream 42 which is passed through the pipe varies with the relative diameters of the venturi throat 30 and the opening 40 to the pipe 38. The arrangement of FIG. 2 with the pipe 38 within the venturi is the most convenient structure. However, the pipe 38 could be an external by-pass pipe.

The pipe 38 confines the reactants fed thereto in a high acidity environment which results in very rapid reaction and enabling all the chlorine dioxide that is to be produced from such reactants to be formed while the flowing reactants are confined within the pipe 38.

The pipe 38 is designed to provide a residence time in the pipe 38 sufficient to permit the reactants therein to form all the chlorine dioxide to be formed therefrom. The residence time generally is about 0.01 to about 1 secs, preferably about 0.2 to about 0.5 secs. This residence time can be achieved by any desired combination of pipe length and diameter and liquid flow rate.

Sulphuric acid in line 32 is fed to a pipe 44 which communicates with the pipe 38. The sulphuric acid is fed as concentrated acid to the pipe 38, generally of concentration from about 30 to about 36 normal. Sulphuric acid is fed to the pipe 38 at a flow rate sufficient to establish the desired acidity of reaction medium in the pipe 38 and also the desired acidity of reaction medium in the generator 12. The diameter of the orifice 40 to the pipe 36 is controlled to provide the proportion of the recycle stream 42 required to match the flow rate of the sulphuric acid achieve a local environment in the pipe 38 having an acid normality within the desired range.

Methanol in line 34 is fed into the sulphuric acid feed pipe 42 and thence to the pipe 38. Alternatively, the methanol may be fed by a separate pipe 46 into the reactor pipe 38.

The feeds of sulphuric acid and methanol combined with the flow rate of recycle stream 42 through the pipe 38 result in the formation of a chlorine dioxide generating reaction medium in the pipe 38. The reaction medium so formed generally has a chlorate concentration of about 0.25 to about 3.5 molar, preferably about 0.5 to about 1.5 molar, an acidity of about 2 to about 10 normal, preferably about 9 to about 10 normal. At the prevailing reaction temperature (i.e. the temperature of the recycle stream 42 leaving the reboiler 24), chlorine dioxide is rapidly formed and such formation is complete by the time the materials emerge from the pipe 38 through a downstream aperture 48 to form, with the proportion of the recycle stream 42 by-passing the pipe, a combined stream 50 which passes to the vessel 12.

Production of chlorine dioxide in the pipe 38 may form part only of the overall chlorine dioxide with the remainder of the chlorine dioxide being generated by reduction of the sodium chlorate with added chloride ions, usually in the form of sodium chloride, fed to the recycle pipe 16 by line 52. Such sodium chloride usually is added as an aqueous solution thereof generally of a concentration from about 1 to about 5 molar, preferably about 4.5 to about 5 molar, or may be fed to the recycle pipe 16 in admixture with the sodium chlorate in line 22.

Feed of sodium chloride solution to the recycle pipe 16 results in a concentration of sodium chloride in the recycle solution of about 0.001 to about 2 molar.

When chlorine dioxide is generated partly by reaction between sodium chlorate, sodium chloride and sulphuric acid, the acidity of the reaction medium downstream of the pipe 38 and in the reaction vessel 12 preferably is within the range conventionally used in the R3 process, namely from about 2 to about 4.8 normal, which results in the production of essentially neutral anhydrous sodium sulphate.

The acidity of the reaction medium is controlled by the flow rate of the sulphuric acid to the pipe 38. It is known that, as a result of the equilibrium:

$$HSO_4^{31} \rightleftharpoons H^+ + SO_4^=$$

$k = 2 \times 10^{-2}$, approximately 98% of the acidity is tied up as $HSO_4^-$ and only about 2% is free hydrogen ion, provided the solution is saturated with respect to sulphate ions, as in the reaction medium in the vessel 12. At 9 normal sulphuric acid, this produces approximately 0.18 N free hydrogen ions.

It is also known that the production of chlorine dioxide is proportional to the relationship:

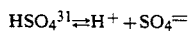

$$\frac{T[H^+]^{3 \text{ to } 4} [ClO_3^-]^2 [Cl^-]^2}{[ClO_2][Cl_2]}$$

Only free hydrogen ions are able to produce chlorine dioxide. Within the tube 38, it is possible to provide at least 0.18 N free hydrogen ion, even at very low total acid normalities (down to zero) in the reaction vessel 12, since a non-equilibrium situation exists where 36 N sulfuric acid is being added by line 32, producing 18 N free $H^+$.

It is also possible, from this free hydrogen ion concept, to use larger volumes of recycle liquor of lower chlorate concentration diverted to the tube 38, while still retaining adequate chlorine dioxide production, thereby providing more flexibility to the process.

An efficiency improving catalyst also may be included in the reaction medium in the vessel 12, in accordance with conventional R3 practice. Such catalysts include Ag, Mn, Cr, Pd and Pt, in the form of metals, and compounds and complexes.

The relative proportions of the reduction of chlorate effected with added chloride ions and with methanol may vary widely, generally from 0.1% by methanol with the balance by chloride ions to 100% by methanol. As the proportion of reductant which is chloride ions increases, more co-produced chlorine appears in the product gas stream.

EXAMPLES

Example 1

A 10 TPD chlorine dioxide generating plant is set up as illustrated in FIGS. 1 and 2. 4000 USGPM of recycle liquor having an acidity of about 7 N and a sodium chlorate concentration of 4 molar enters the venturi pipe 30. The aperture at the upstream end of the pipe 38 is sized to permit a flow of 10 USGPM into the pipe. 1.0 USGPM of 36 N sulphuric acid and 0.3 USGPM of methanol are flowed to the pipe 38 through pipe 44 to establish therein an acidity of 9.38 N. The pipe 38 is sized to permit a residence time of 0.5 seconds, which is sufficient for complete reaction of the sodium chlorate to chlorine dioxide to occur in the pipe. Chlorine dioxide of purity 98% at a chemical efficiency of 98% is recovered from the generator by line 14. Crystals of sodium sulphate recovered from the generator in line 20 analyze approximately 100% sodium sesquisulphate.

Example 2

The procedure of Example 1 was repeated, except that 50% of the chlorine dioxide production was by reaction with methanol in pipe 38 and 50% by reaction with sodium chloride fed by line 52 to the recycle pipe 16. The recycle liquor has an acidity of 3.5 normal and a sodium chlorate concentration of 4 molar. In this case, 2.8 USGPM of 5.0 molar sodium chloride is fed to the recycle pipe 16, 1.3 USGPM of 36 N sulphuric acid and 0.15 USGPM of methanol are flowed to the pipe 38 by line 44 to establish within the pipe 38 an acidity of 7.14 N.

Chlorine dioxide is produced at a chemical efficiency of 97% and is recovered from the generator by line 14. Crystals of anhydrous neutral sodium sulphate are recovered from the generator. About 3 TPD of $Cl_2$ is coproduced with the 10 TPD chlorine dioxide, i.e. the chlorine dioxide has a purity of about 77%.

Example 3

The procedure of Example 1 is repeated, except that the total acid normality of the recycle stream is decreased to 3.5 N. Under these conditions, the total acid normality in the pipe 38 drops to 6.28 compared to the total acid normality of 9.38 in Example 1. Efficient chlorine dioxide production is retained, since the free hydrogen ion concentration in the pipe 38 is still at least 0.18 N $H^+$, as can be seen from the calculation:

$$\frac{10 \times 0.02 \times 3.5 + 1 \times 18N \text{ free } H^+}{11.3 \text{ USGPM}} = 1.65N \text{ free } H^+$$

Example 4

The procedure of Example 1 is repeated, except that 20 USGPM of 2 M $NaClO_3$ is employed as the recycle liquor. This flow rate produces a total acid normality of 8.26 N. Efficient chlorine dioxide production is retained since the free hydrogen ion concentration remains at least 0.18 N free $H^+$, as can be seen from the calculation:

$$\frac{20 \times 0.02 \times 7 \times 1 \times 18}{21.3 \text{ USGPM}} = 0.98N \text{ free } H^+$$

Example 5

The recycle stream entering pipe 38 may have as low as zero normal total acid normality and still sufficient free hydrogen ion concentration can be achieved in the pipe 38 to effect efficient chlorine dioxide production. Repeating the procedure of Example 1 but with a recycle stream of 0N total acid normality, the corresponding calculation to that in Example 3:

$$\frac{10 \times 0 + 1 \times 18}{11.3} = 1.56 \text{ free } H^+$$

with the total acid normality in the pipe being calculated as:

$$\frac{10 \times 0 + 1 \times 36}{11.3} = 3.18N$$

SUMMARY OF DISCLOSURE

In summary of this disclosure, the present invention provides a novel method of producing chlorine dioxide wherein chlorine dioxide less contaminated with chlorine can be produced with less acid sodium sulphate being produced. Modifications are possible within the scope of this invention.

What we claim is:

1. A process for preparing chlorine dioxide, which comprises :
   feeding into a first elongate zone an aqueous sodium chlorate-containing stream having an elevated temperature which is about its boiling pint at a subatmospheric pressure applied to the downstream end of said first zone,
   diverting a portion of the aqueous sodium chlorate-containing stream into a second elongate zone located within said first elongate zone,
   feeding methanol and sulphuric acid only into said second elongate zone to form a chlorine dioxide-generating reaction medium in said second elongate zone having an acidity greater than that of said sodium chlorate-containing stream in said first elongate zone,
   generating chlorine dioxide from said chlorine dioxide-generating reaction medium in said second elongate zone,
   discharging chlorine dioxide and spent reaction medium from said second elongate zone and an aqueous sodium chlorate-containing stream from said first elongate zone into an evaporating and crystallizing zone wherein by-product crystalline sodium sulphate is formed, and
   recovering a gaseous admixture of chlorine dioxide and steam from said evaporating and crystallizing zone and removing crystalline sodium sulphate from said evaporating and crystallizing zone.

2. The process of claim 1 wherein said crystalline by-product sodium sulphate is removed from said evaporating and crystallizing zone in admixture with spent reaction medium, make-up sodium chlorate is added to said admixture, to provide a recycle stream containing sodium chlorate and sulphuric acid, said recycle stream is heated to an elevated temperature which is about its boiling point at said subatmospheric pressure and said heated recycle stream is fed to said first elongate zone as said aqueous sodium chlorate-containing stream.

3. The process of claim 2 wherein said make-up sodium chlorate is added as an aqueous sodium chlorate solution having a concentration of about 1 to about 7.5 molar.

4. The process of claim 3 wherein said recycle stream has a sodium chlorate concentration of about 0.25 to about 3.5 molar.

5. The process of claim 4 wherein said recycle stream is heated to an elevated temperature of about 50° to about 90° C.

6. The process of claim 1 wherein said chlorine dioxide-generating reaction medium has a residence time of about 0.01 to about 1 seconds in said second elongate reaction zone.

7. The process of claim 6 wherein said residence time is about 0.2 to about 0.5 seconds.

8. The process of claim 6 wherein said sulphuric acid fed to said second elongate zone has a normality of about 30 to about 36 normal.

9. The process of claim 6 wherein said chlorine dioxide-generating reaction medium in said second elongate zone has a chlorate concentration of about 0.25 to about 3.5 molar and an acidity of about 2 to about 10 normal.

10. The process of claim 2 wherein said sodium chlorate-containing stream also contains sodium chloride, whereby chlorine dioxide also is generated by reaction between sodium chlorate, sodium chloride and sulphuric acid in a reaction medium downstream of said second elongate reaction zone in said evaporating and crystallizing zone.

11. The process of claim 10 wherein said sodium chloride is present in said sodium chlorate-containing stream by feeding an aqueous solution of sodium chloride having a concentration of about 1 to about 5 molar to said recycle stream.

12. The process of claim 11 wherein said recycle stream has a sodium chloride concentration of about 0.001 to about 2 molar.

13. The process of claim 2 wherein said diverted portion of said aqueous sodium chlorate solution and said fed methanol and sulphuric acid result in a concentration of free hydrogen ions in said second elongate zone of at least 0.18 normal.

14. The process of claim 13 wherein said spent reaction medium has a total acid normality from 0 to 12 normal.

15. A process for preparing chlorine dioxide, comprises:
feeding into a first elongate zone an aqueous sodium chlorate-containing stream having an elevated temperature which is about its boiling point at a subatmospheric pressure applied to the downstream end of said first zone,
diverting a portion of the aqueous sodium chlorate-containing stream into a second elongate zone located within said first elongate zone and out of fluid flow communication therewith and areas downstream thereof except at upstream and downstream ends of said second elongate zone,
feeding methanol and sulphuric acid into said second elongate zone only to form a chlorine dioxide-generating reaction medium in said second elongate zone having a concentration of free hydrogen ions of at least 0.18 normal and an acidity greater than that of said sodium chlorate-containing stream in said first elongate zone,
substantially completely generating chlorine dioxide from the sodium chlorate in said chlorine dioxide-generating reaction medium in said second elongate reaction zone during a residence time of said reaction medium in said second elongate zone of about 0.01 to about 1 second,
discharging chlorine dioxide and spent reaction medium from said second elongate zone and an aqueous sodium chlorate-containing stream from said first elongate zone into a evaporating and crystallizing zone wherein by-product crystalline sodium sulphate is precipitated from an aqueous medium having a total acid normality of 0 to 12 normal,
recovering a gaseous admixture of chlorine dioxide and steam from said evaporating and crystallizing zone,
removing crystalline sodium sulphate from said evaporating and crystallizing zone in admixture with spent reaction medium,
adding make-up sodium chlorate to said admixture and removing by-product sodium sulphate from said admixture to provide a recycle stream containing sodium chlorate,
heating said recycle stream to an elevated temperature which is about its boiling point at said subatmospheric pressure, and
feeding said heated recycle stream to said first elongate zone as said aqueous sodium chlorate-containing stream.

16. A process for preparing chlorine dioxide, which comprises:
reacting sodium chlorate, sodium chloride and sulphuric acid in a first aqueous acid reaction medium having a total acid normality below about 4.8 normal in a combined reacting, evaporating and crystallizing zone,
maintaining said aqueous reaction medium at its boiling point while a subatmospheric pressure is applied to said combined zone,
crystallizing by-product sodium sulphate from the first aqueous acid reaction medium in said combined zone and recovering a gaseous admixture of chlorine dioxide and steam from said combined zone,
removing said crystalline by-product sodium sulphate from said combined zone in admixture with spent reaction medium,
recovering said by-product sodium sulphate from said admixture,
forming a recycle stream having a sodium chlorate concentration of about 0.25 to about 3.5 molar and a sodium chloride concentration of about 0.001 to about 2 molar by feeding sodium chlorate and sodium chloride to said admixture,
heating said recycle stream to its boiling point at said subatmospheric pressure and feeding said heated recycle stream into a first elongate zone, diverting a portion of said heated recycle stream into a second elongate zone located within said first elongate zone and out of fluid flow communication with said first elongate zone and areas downstream of said first elongate except at upstream and downstream ends of said second elongate zone, feeding methanol and sulphuric acid into said second elongate zone only to form a second chlorine dioxide generating reaction medium having an acidity of about 9 to about 10 normal and greater than that of said recycle stream in said first elongate zone, generating chlorine dioxide from said second chlorine dioxide-generating reaction medium in said second elongate zone during a residence time of about 0.01 to about 1 second, and discharging chlorine dioxide and spent reaction medium from said second elongate zone into admixture with recycle stream existing said first elongate zone and forwarding said admixture to said combined zone, whereby said sulphuric acid fed to said second elongate zone provides the sulphuric acid in said first aqueous acid reaction medium and the total acid normality thereof.

17. A process of preparing chlorine dioxide, which comprises:

feeding into a first elongate zone an aqueous sodium chlorate-containing stream having a sodium chlorate concentration of about 0.25 to about 3.5 molar and an elevated temperature of about 50° C. to about 90° C. which is about its boiling point at a subatmospheric pressure applied to the downstream end of said first elongate zone, diverting a portion of the aqueous sodium chlorate-containing stream into a second elongate zone located within said first elongate zone but out of fluid flow communication with said first elongate zone, and areas downstream of said first elongate zone, except at upstream and downstream ends of said second elongate zone, feeding methanol and sulphuric acid having a normality of about 30 to about 36 normal into said second elongate zone only said first elongate zone to form a chlorine dioxide-generating reaction medium having an acidity of about 2 to about 10 normal and greater than that of said sodium chlorate-containing stream in said first elongate zone, substantially completely generating chlorine dioxide from the sodium chlorate in said chlorine dioxide-generating medium in said second elongate zone during a residence time of said chlorine dioxide-generating medium in said second elongate zone of about 0.01 to about 1 second, discharging chlorine dioxide and spent reaction medium from said second elongate zone and an aqueous sodium chlorate-containing stream from said first elongate zone into an evaporating and crystallizing zone wherein by-product crystalline sodium sulphate is formed, recovering a gaseous admixture of chlorine dioxide and steam from said evaporating and crystallizing zone, removing crystalline sodium sulphate from said evaporating and crystallizing zone in admixture with spent reaction medium, adding an aqueous sodium chlorate solution having a sodium chlorate concentrate of about 1 to about 7.5 molar to said admixture to make-up sodium chlorate consumed in the production of chlorine dioxide and removing by-product sodium sulphate from said admixture to provide a recycle stream containing sodium chlorate having a concentration of about 0.25 to about 3 molar, heating said recycle stream to an elevated temperature of about 50° to about 90° C. which is about the boiling point at said subatmospheric pressure, and feeding said heated recycle stream to said first elongate zone as said aqueous sodium chlorate-containing stream.

18. The process of claim 17 wherein said aqueous sodium chlorate solution has a concentration of about 5 to about 6.5 molar.

19. The process of claim 11 wherein said recycle stream has a sodium chlorate concentration of about 0.5 to about 1.5 molar.

20. The process of claim 19 wherein said recycle stream is heated to an elevated temperature of about 70° to about 80° C.

21. The process of claim 11 wherein said chlorine dioxide-generating reaction medium in said second elongate zone has a chlorate concentration of about 0.5 to about 1.5 molar and an acidity of about 9 to about 10 normal.

22. The process of claim 17, wherein an aqueous solution of sodium chloride having a concentration of about 1 to about 5 molar sodium chloride is fed to said recycle stream to provide therein a sodium chloride concentration of about 0.001 to about 2 molar.

23. The process of claim 22, wherein said aqueous solution of sodium chloride has a concentration of about 4.5 to about 5 molar.

24. The process of claim 22 wherein the reaction medium in said evaporating and crystallizing zone has an acidity of less than about 4.8 normal.

25. The process of claim 24 wherein the proportion of the chlorine dioxide present in said recovered gaseous admixture of chlorine dioxide and steam formed by reaction of sodium chlorate, methanol and said fed sulphuric acid in said second elongate zone and the proportion of the chlorine dioxide present in said recovered gaseous admixture of chlorine dioxide and steam formed by reaction of sodium chlorate, sodium chloride and said fed sulphuric acid downstream of said second elongate zone is at least 0.1% by reaction in said second elongate zone and no more than 99.9% by reaction downstream of said second elongate zone, and said proportions are controlled by controlling the proportion of said aqueous sodium chlorate-containing stream which is diverted into said second elongate zone, whereby said sulphuric acid fed to said second elongate zone provides all the sulphuric acid for both chlorine dioxide-generating reactions.

26. The process of claim 25 wherein a chlorine dioxide production efficiency-enhancing catalyst is present in said evaporating and crystallizing zone, said catalyst being selected from Ag, Mn, Cr, Pd and Pt.

* * * * *